United States Patent
Showering (10) Patent No.: US 8,988,578 B2
(45) Date of Patent: Mar. 24, 2015

(54) MOBILE COMPUTING DEVICE WITH IMPROVED IMAGE PREVIEW FUNCTIONALITY

(75) Inventor: Paul Edward Showering, Chippenham (GB)

(73) Assignee: Honeywell International Inc., Fort Mill, SC (US)

( * ) Notice: Subject to any disclaimer, the term of this patent is extended or adjusted under 35 U.S.C. 154(b) by 0 days.

(21) Appl. No.: 13/365,422

(22) Filed: Feb. 3, 2012

(65) Prior Publication Data

US 2013/0201377 A1    Aug. 8, 2013

(51) Int. Cl.
*H04N 5/222* (2006.01)
*G09G 5/00* (2006.01)
*H04N 5/232* (2006.01)

(52) U.S. Cl.
CPC ....... *H04N 5/23258* (2013.01); *H04N 5/23267* (2013.01); *H04N 5/23293* (2013.01)
USPC ..................................... 348/333.02; 345/619

(58) Field of Classification Search
USPC ............. 348/333.01–333.05, 333.11, 333.12
See application file for complete search history.

(56) References Cited

U.S. PATENT DOCUMENTS

| | | | |
|---|---|---|---|
| 4,301,599 A | 11/1981 | Leay | |
| 4,656,525 A | 4/1987 | Norris | |
| 4,819,101 A | 4/1989 | Lemelson | |
| 5,027,400 A | 6/1991 | Baji et al. | |
| 5,084,768 A | 1/1992 | Stern et al. | |
| 5,260,837 A | 11/1993 | Lemelson | |
| 5,289,274 A * | 2/1994 | Kondo | 348/208.6 |
| 5,379,159 A | 1/1995 | Lemelson | |
| 5,473,744 A | 12/1995 | Allen et al. | |
| 5,619,249 A | 4/1997 | Billock et al. | |
| 5,828,406 A | 10/1998 | Parulski et al. | |
| 5,841,512 A | 11/1998 | Goodhill | |
| 5,903,892 A | 5/1999 | Hoffert et al. | |
| 5,926,230 A | 7/1999 | Niijima et al. | |
| 5,956,083 A | 9/1999 | Taylor et al. | |
| 5,990,931 A | 11/1999 | Nimri et al. | |
| 6,043,845 A | 3/2000 | Thompson | |
| 6,081,262 A | 6/2000 | Gill et al. | |
| 6,084,590 A | 7/2000 | Robotham et al. | |
| 6,122,006 A | 9/2000 | Bogdanowicz et al. | |
| 6,134,547 A | 10/2000 | Huxley et al. | |
| 6,198,544 B1 | 3/2001 | Wess et al. | |
| 6,282,549 B1 | 8/2001 | Hoffert et al. | |
| 6,292,218 B1 | 9/2001 | Parulski et al. | |
| 6,314,575 B1 | 11/2001 | Billock et al. | |
| 6,370,543 B2 | 4/2002 | Hoffert et al. | |
| 6,614,454 B1 | 9/2003 | Livingston | |
| 6,618,051 B1 | 9/2003 | Edwards et al. | |
| RE38,284 E | 10/2003 | Allen et al. | |

(Continued)

*Primary Examiner* — Twyler Haskins
*Assistant Examiner* — Padma Haliyur
(74) *Attorney, Agent, or Firm* — Additon, Higgins & Pendleton, P.A.

(57) ABSTRACT

A mobile computing device can comprise a microprocessor, a display, at least one motion sensor, and an imaging device including a two-dimensional image sensor and an imaging lens configured to focus an image of a target object on the image sensor. The mobile computing device can be configured to periodically display a preview image frame of the target object. The mobile computing device can be further configured to compensate for a movement of the imaging device relatively to the target object during a time period elapsed between taking and displaying the preview image frame, by transforming the preview image frame based on the device movement detected by the motion sensor.

20 Claims, 5 Drawing Sheets

(56) References Cited

U.S. PATENT DOCUMENTS

| | | |
|---|---|---|
| 6,654,031 B1 | 11/2003 | Ito et al. |
| 6,677,981 B1 | 1/2004 | Mancuso et al. |
| 6,718,231 B2 | 4/2004 | Konno et al. |
| 6,735,776 B1 | 5/2004 | Legate |
| 6,885,392 B1 | 4/2005 | Mancuso et al. |
| 6,921,336 B1 | 7/2005 | Best |
| 6,947,598 B2 | 9/2005 | Yogeshwar et al. |
| 6,995,793 B1 | 2/2006 | Albadawi et al. |
| 7,064,783 B2 | 6/2006 | Colavin et al. |
| 7,071,969 B1 | 7/2006 | Stimson, III |
| 7,076,332 B2 | 7/2006 | Cifra et al. |
| 7,088,396 B2 | 8/2006 | Fredlund et al. |
| 7,209,229 B2 | 4/2007 | Hoot |
| 7,221,398 B2 | 5/2007 | Stavely et al. |
| 7,309,464 B2 | 12/2007 | Meissner et al. |
| 7,318,202 B2 | 1/2008 | Sugiyama et al. |
| 7,400,348 B2 | 7/2008 | Hoyos |
| 7,505,163 B2 | 3/2009 | Hart et al. |
| 7,522,912 B2 | 4/2009 | Seo et al. |
| 7,570,380 B2 | 8/2009 | Hart et al. |
| 7,583,786 B2 | 9/2009 | Jing et al. |
| 7,620,218 B2 | 11/2009 | Steinberg et al. |
| 7,640,514 B2 | 12/2009 | Camara et al. |
| 7,689,898 B2 | 3/2010 | Merril et al. |
| 7,697,778 B2 | 4/2010 | Steinberg et al. |
| 7,715,660 B2 | 5/2010 | Ching |
| 7,755,667 B2 * | 7/2010 | Rabbani et al. ............ 348/208.6 |
| 7,760,239 B2 | 7/2010 | Kim et al. |
| 7,849,416 B2 | 12/2010 | Chandhoke et al. |
| 7,856,055 B2 | 12/2010 | Zhou et al. |
| 7,907,198 B2 | 3/2011 | Tognazzini |
| 8,073,207 B2 | 12/2011 | Ayaki et al. |
| 8,107,141 B2 | 1/2012 | Patrick et al. |
| 8,111,744 B2 | 2/2012 | Kim |
| 8,155,391 B1 | 4/2012 | Tang et al. |
| 8,224,087 B2 | 7/2012 | Bronstein et al. |
| 8,249,164 B2 | 8/2012 | Sadowski |
| 8,261,191 B2 | 9/2012 | Ording |
| 8,271,030 B2 | 9/2012 | Lee |
| 8,330,797 B2 | 12/2012 | Kim et al. |
| 8,340,474 B2 | 12/2012 | Kim et al. |
| 8,390,672 B2 | 3/2013 | Ryu et al. |
| 8,396,321 B1 | 3/2013 | Aldrich |
| 2001/0043219 A1 | 11/2001 | Robotham et al. |
| 2002/0052933 A1 | 5/2002 | Leonhard et al. |
| 2002/0059581 A1 | 5/2002 | Billock et al. |
| 2002/0126151 A1 | 9/2002 | Chandhoke |
| 2002/0140873 A1 * | 10/2002 | Van Dijk et al. ............ 348/797 |
| 2002/0167607 A1 | 11/2002 | Eerenberg et al. |
| 2002/0184628 A1 | 12/2002 | Kim et al. |
| 2003/0084178 A1 | 5/2003 | Simpson et al. |
| 2003/0169303 A1 | 9/2003 | Islam et al. |
| 2003/0191816 A1 | 10/2003 | Landress et al. |
| 2003/0219226 A1 | 11/2003 | Newell et al. |
| 2004/0021898 A1 | 2/2004 | Ashizaki |
| 2004/0061773 A1 | 4/2004 | Liu |
| 2004/0090546 A1 | 5/2004 | Doron |
| 2004/0174934 A1 | 9/2004 | Komi et al. |
| 2004/0205220 A1 | 10/2004 | Nakamura et al. |
| 2004/0213544 A1 | 10/2004 | Legate |
| 2005/0057500 A1 | 3/2005 | Bohn |
| 2005/0058431 A1 | 3/2005 | Jia et al. |
| 2005/0068568 A1 | 3/2005 | Hart et al. |
| 2005/0068570 A1 | 3/2005 | Hart et al. |
| 2005/0096539 A1 | 5/2005 | Leibig et al. |
| 2005/0123892 A1 | 6/2005 | Cornelius et al. |
| 2005/0153764 A1 | 7/2005 | Sterchi et al. |
| 2005/0188057 A1 | 8/2005 | Joo |
| 2005/0193341 A1 | 9/2005 | Hayward et al. |
| 2005/0200762 A1 | 9/2005 | Barletta et al. |
| 2005/0231513 A1 | 10/2005 | LeBarton et al. |
| 2005/0280842 A1 | 12/2005 | Rodriguez et al. |
| 2006/0044265 A1 | 3/2006 | Min |
| 2006/0052152 A1 | 3/2006 | Tedsen et al. |
| 2006/0070108 A1 | 3/2006 | Renkis |
| 2006/0119597 A1 | 6/2006 | Oshino |
| 2006/0120670 A1 | 6/2006 | Lee |
| 2006/0143078 A1 | 6/2006 | Pozniansky et al. |
| 2006/0171453 A1 | 8/2006 | Rohlfing et al. |
| 2006/0181721 A1 | 8/2006 | Kulkarni et al. |
| 2006/0198437 A1 | 9/2006 | Kim |
| 2006/0274155 A1 | 12/2006 | Kim et al. |
| 2007/0011704 A1 | 1/2007 | Anglin |
| 2007/0014480 A1 | 1/2007 | Sirohey et al. |
| 2007/0033528 A1 | 2/2007 | Merril et al. |
| 2007/0036265 A1 | 2/2007 | Jing et al. |
| 2007/0040928 A1 | 2/2007 | Jung et al. |
| 2007/0052856 A1 | 3/2007 | Jung et al. |
| 2007/0081081 A1 | 4/2007 | Cheng |
| 2007/0092244 A1 | 4/2007 | Pertsel et al. |
| 2007/0109411 A1 | 5/2007 | Jung et al. |
| 2007/0130002 A1 | 6/2007 | Moran et al. |
| 2007/0188510 A1 | 8/2007 | Kokemohr |
| 2007/0231778 A1 | 10/2007 | Kim et al. |
| 2007/0237225 A1 | 10/2007 | Luo et al. |
| 2007/0262995 A1 | 11/2007 | Tran |
| 2007/0274563 A1 | 11/2007 | Jung et al. |
| 2008/0005269 A1 | 1/2008 | Knighton et al. |
| 2008/0034306 A1 | 2/2008 | Ording |
| 2008/0043108 A1 | 2/2008 | Jung et al. |
| 2008/0052090 A1 | 2/2008 | Heinemann et al. |
| 2008/0158351 A1 | 7/2008 | Rodriguez et al. |
| 2008/0216022 A1 | 9/2008 | Lorch et al. |
| 2008/0218611 A1 | 9/2008 | Parulski et al. |
| 2008/0231740 A1 | 9/2008 | McIntyre et al. |
| 2008/0231741 A1 | 9/2008 | McIntyre et al. |
| 2008/0259175 A1 | 10/2008 | Muramatsu et al. |
| 2008/0298571 A1 | 12/2008 | Kurtz et al. |
| 2009/0003652 A1 | 1/2009 | Steinberg et al. |
| 2009/0022422 A1 | 1/2009 | Sorek et al. |
| 2009/0051787 A1 | 2/2009 | Yoon et al. |
| 2009/0079764 A1 | 3/2009 | Lin et al. |
| 2009/0147092 A1 | 6/2009 | Nakada et al. |
| 2009/0158222 A1 | 6/2009 | Kerr |
| 2009/0304147 A1 | 12/2009 | Jing et al. |
| 2010/0060727 A1 | 3/2010 | Steinberg et al. |
| 2010/0066763 A1 | 3/2010 | MacDougall et al. |
| 2010/0079485 A1 * | 4/2010 | Bentley ..................... 345/619 |
| 2010/0097375 A1 | 4/2010 | Tadaishi et al. |
| 2010/0110266 A1 | 5/2010 | Lee et al. |
| 2010/0157167 A1 | 6/2010 | Lawther et al. |
| 2010/0171691 A1 | 7/2010 | Cook et al. |
| 2010/0205537 A1 | 8/2010 | Knighton et al. |
| 2010/0214216 A1 | 8/2010 | Nasiri et al. |
| 2010/0214451 A1 | 8/2010 | Hwang et al. |
| 2010/0271506 A1 | 10/2010 | Chen |
| 2010/0277603 A1 * | 11/2010 | Tsai ......................... 348/208.4 |
| 2010/0328472 A1 | 12/2010 | Steinberg et al. |
| 2011/0013072 A1 | 1/2011 | Choi |
| 2011/0050730 A1 | 3/2011 | Ranford et al. |
| 2011/0098918 A1 | 4/2011 | Siliski et al. |
| 2011/0102630 A1 | 5/2011 | Rukes |
| 2011/0128410 A1 | 6/2011 | Lee et al. |
| 2011/0142318 A1 | 6/2011 | Chen et al. |
| 2011/0149094 A1 | 6/2011 | Chen et al. |
| 2011/0155808 A1 | 6/2011 | Santos et al. |
| 2011/0157231 A1 | 6/2011 | Ye et al. |
| 2011/0161365 A1 | 6/2011 | Shin et al. |
| 2011/0163955 A1 | 7/2011 | Nasiri et al. |
| 2011/0193989 A1 | 8/2011 | Steinberg et al. |
| 2011/0199493 A1 | 8/2011 | Steinberg et al. |
| 2011/0211081 A1 * | 9/2011 | Tsubaki et al. ............ 348/208.1 |
| 2011/0228329 A1 | 9/2011 | Suzuki |
| 2011/0230232 A1 | 9/2011 | Tran |
| 2011/0234779 A1 | 9/2011 | Weisberg |
| 2011/0285874 A1 | 11/2011 | Showering et al. |
| 2011/0289394 A1 | 11/2011 | Roh et al. |
| 2011/0292042 A1 | 12/2011 | Vaganov |
| 2011/0293244 A1 | 12/2011 | Kuriyama |
| 2011/0298709 A1 | 12/2011 | Vaganov |
| 2012/0012656 A1 * | 1/2012 | Wang ....................... 235/462.25 |
| 2012/0022786 A1 | 1/2012 | Siliski et al. |
| 2012/0069052 A1 | 3/2012 | Lee et al. |
| 2012/0081385 A1 | 4/2012 | Cote et al. |

(56) References Cited

U.S. PATENT DOCUMENTS

| | | |
|---|---|---|
| 2012/0092435 A1 | 4/2012 | Wohlert |
| 2012/0121187 A1 | 5/2012 | Lee et al. |
| 2012/0162101 A1 | 6/2012 | Song et al. |
| 2012/0179969 A1 | 7/2012 | Lee et al. |
| 2012/0229391 A1 | 9/2012 | Skinner et al. |
| 2012/0249792 A1* | 10/2012 | Wilborn .................. 348/148 |
| 2012/0249837 A1 | 10/2012 | Chen |
| 2012/0260293 A1 | 10/2012 | Young et al. |
| 2012/0268615 A1 | 10/2012 | Choi et al. |
| 2012/0293607 A1 | 11/2012 | Bhogal et al. |
| 2012/0300023 A1 | 11/2012 | Lee |
| 2012/0307086 A1* | 12/2012 | Jefremov et al. .......... 348/208.4 |
| 2012/0321283 A1 | 12/2012 | Cormican et al. |
| 2012/0327269 A1 | 12/2012 | Hwang et al. |
| 2013/0009951 A1 | 1/2013 | Kwon et al. |
| 2013/0010138 A1 | 1/2013 | Bigioi et al. |
| 2013/0016409 A1 | 1/2013 | Kurtz et al. |
| 2013/0050430 A1 | 2/2013 | Lee |
| 2013/0069937 A1 | 3/2013 | Kim |
| 2013/0121556 A1 | 5/2013 | Matsumoto |
| 2013/0151967 A1 | 6/2013 | Kerr et al. |

* cited by examiner

MOBILE COMPUTING DEVICE WITH IMPROVED IMAGE PREVIEW FUNCTIONALITY

FIELD OF THE INVENTION

This invention relates generally to mobile computing devices equipped with digital cameras, and, more specifically, to mobile computing devices equipped with digital cameras providing image preview functionality.

BACKGROUND OF THE INVENTION

Mobile computing devices equipped with digital imaging devices are widely used for many imaging applications. A common type of a digital imaging device includes a lens configured to focus an image of the target object onto a two-dimensional image sensor, which is often provided by a complementary metal-oxide semiconductor (CMOS) image sensor that converts light signals into electric signals. A preview image can be displayed on the screen of the mobile computing device to facilitate aiming of the imaging device.

SUMMARY OF THE INVENTION

In one embodiment, there is provided a mobile computing device comprising a microprocessor, a display, at least one motion sensor, and an imaging device including a two-dimensional image sensor and an imaging lens configured to focus an image of a target object on the image sensor. The mobile computing device can be configured to periodically display a preview image frame of the target object. The mobile computing device can be further configured to compensate for a movement of the imaging device relatively to the target object during a time period elapsed between taking and displaying the preview image frame, by transforming the preview image frame based on the device movement detected by the motion sensor.

In a further aspect, at least one motion sensor can be provided by an accelerometer.

In a further aspect, at least one motion sensor can be provided by an gyroscope.

In a further aspect, the imaging device can be configured to measure distance between the imaging lens and the target object.

In a further aspect, the transformation of the preview image frame can comprise a pixel shift.

In a further aspect, the transformation of the preview image frame can comprise rotation of the preview image.

In a further aspect, the transformation of the preview image frame can comprise scaling of the preview image.

In a further aspect, the mobile computing device can be further configured to introduce a colored polygon to the preview image frame to minimize a perceived visual disturbance caused by the mobile computing device movement.

In a further aspect, the polygon can be colored using a color similar to a color of an area of the preview image frame closest to the polygon.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In one embodiment, there is provided a mobile computing device comprising an imaging device having a two-dimensional image sensor and an imaging lens configured to focus an image of a target object on the image sensor. A "mobile computing device" herein shall refer to a portable programmable device for data processing, including a central processing unit (CPU), a memory, and at least one communication interface. A mobile computing device can be provided, e.g., by a personal digital assistant (PDA), a portable data terminal (PDT), or a smart phone.

The mobile computing device can further comprise a display that can be employed, inter alia, for periodically displaying a preview image of the target object. In a further aspect, the frequency of preview frames can be high enough to provide a "quasi real-time" preview, thus facilitating aiming the mobile computing device in the direction of the target object.

However, a noticeable time lag between capturing and displaying a frame can result from the time needed to capture each preview frame and to perform post-processing of the preview frame. As the lag becomes greater, it becomes more and more difficult for the user to accurately aim the mobile computing device in the direction of the target object, which in turn leads to increasing the time needed to capture an image, thus increasing the power consumption by the mobile computing device and reducing the useful battery life.

In one embodiment, the mobile computing device can be configured to compensate for the device movement relatively to the target object during the time period elapsed between taking and displaying a preview image frame. The mobile computing device can be configured to transform the preview image frame based on the device movement detected by a motion sensor (e.g., an accelerometer and/or a gyroscope). In a further aspect, the preview image can be shifted, rotated, and/or scaled in order to compensate for the device movement.

Preview image frame transformation to compensate for the device movement can be considered as being opposed to image stabilization, since preview image frame transformation is intended to move the image as the imaging device moves, so that the preview display shows where the imaging device is pointing at the time the user sees the preview image, rather than where the imaging device was pointing at the time the image was captured.

Figure 1A:
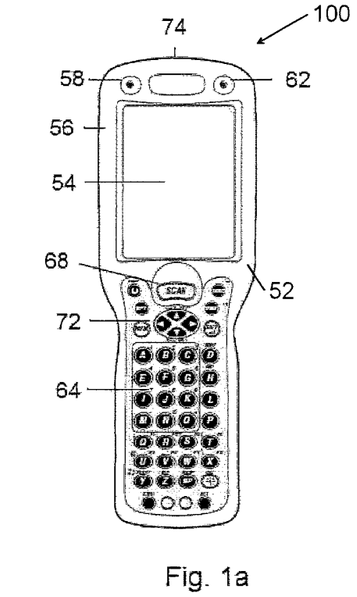
FIGS. 1a-1c schematically illustrate one embodiment of a mobile computing device.

One embodiment of mobile computing device 100 is shown in FIGS. 1a (front panel view), 1b (side panel view), and 1c (bottom panel view). Mobile computing device 100 can comprise housing 52 within which other components of mobile computing device 100 can be disposed. LCD screen display with touch screen sensor 54 can be disposed on the front panel 56. Also disposed on front panel 56 can be LED-based indicators 58 and 62, and keyboard 64 including functional and navigation keys 68, 72. Imaging window 74 can be disposed on the top panel of housing 52. Disposed on the side panel (best viewed in FIG. 1b) can be infra-red communication port 76, access door to a secure digital (SD) memory interface 78, audio jack 80, and hand strap 82. Disposed on the bottom panel (best viewed in FIG. 1c) can be multi-pin mechanical connector 84 and hand strap clip 86.

Figure 1B:
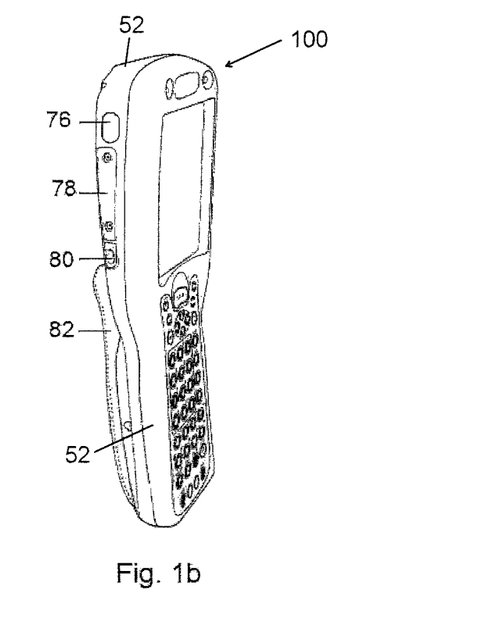
Figure 1C:
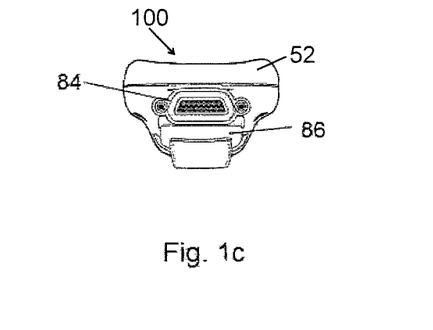

The mobile computing device 100 can be used, for example, for bar code reading and decoding in POS and other applications. A skilled artisan would appreciate the fact that other uses of mobile computing device 100 are within the scope of this disclosure.

Figure 2:
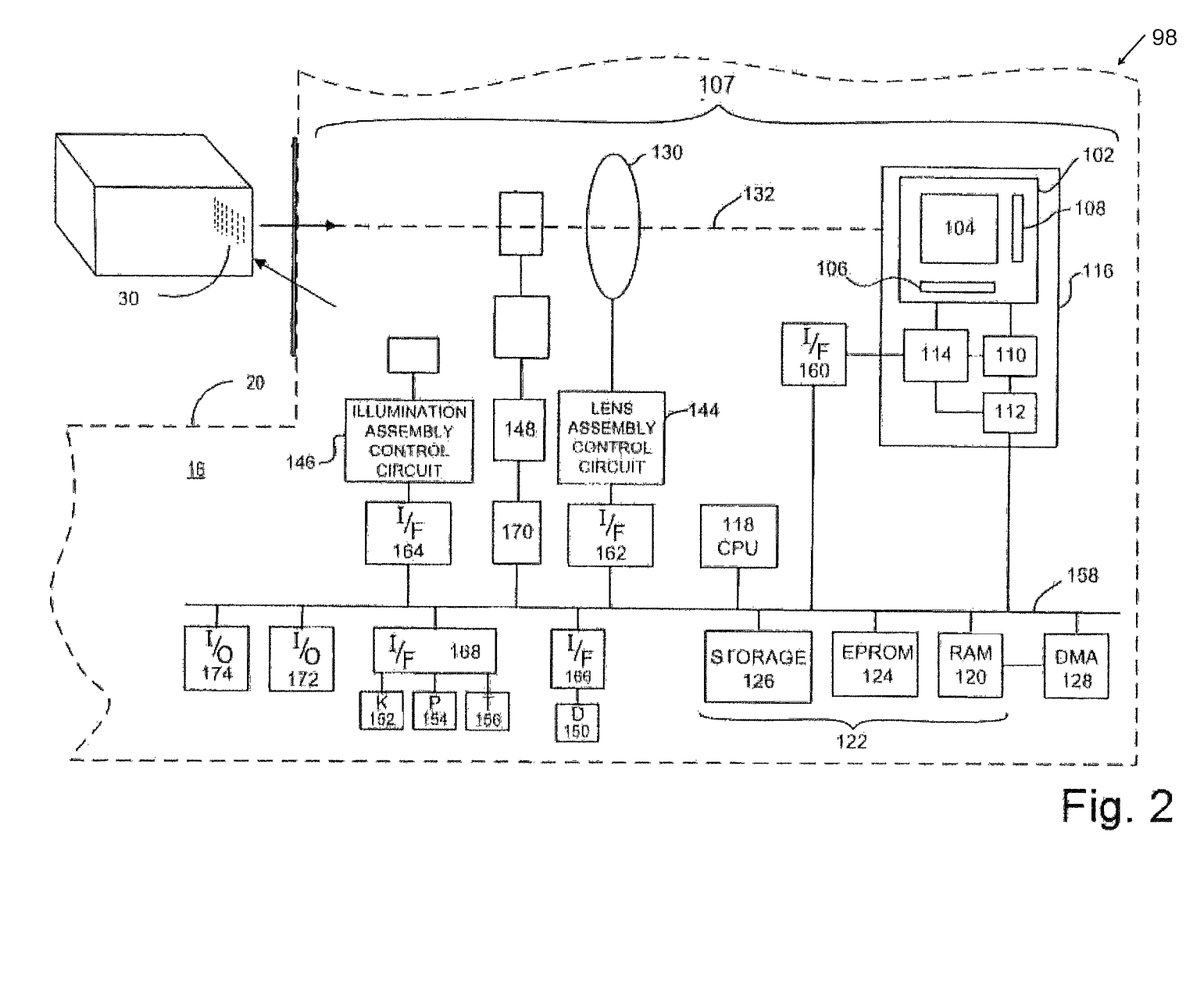
FIG. 2 schematically illustrates a component diagram of one embodiment of mobile computing device.

FIG. 2 schematically illustrates a component diagram of one embodiment of mobile computing device 100. The imaging device 98 can comprise a multiple pixel image sensor assembly 107. The image sensor assembly 107 can include an image sensor 102 comprising a multiple pixel image sensor array 104 having pixels arranged in rows and columns of pixels, column circuitry 106, and row circuitry 108. Associated with the image sensor 102 can be amplifier circuitry 110, and an A/D converter 112 which can convert image information in the form of analog signals read out of multiple pixel image sensor 104 into image information in the form of digital signals. Image sensor 102 can also have an associated timing and control circuit 114 for use in controlling, e.g., the exposure period of image sensor 102, and/or gain applied to the amplifier 110. The noted circuit components 102, 110, 112, and 114 can be packaged into a common image sensor integrated circuit 116.

In the course of operation of the image sensor assembly 107, image signals can be read out of image sensor 102, converted and stored into a system memory such as RAM 120. A memory 122 of image sensor assembly 107 can include RAM 120, a nonvolatile memory such as EPROM 124, and a storage memory device 126 such as may be provided by a flash memory or a hard drive memory. In one embodiment, image sensor assembly 107 can include microprocessor 118 which can be adapted to read out image data stored in memory 122 and subject such image data to various image processing algorithms. Image sensor assembly 107 can include a direct memory access unit (DMA) 128 for routing image information read out from image sensor 102 that has been subject to conversion to RAM 120. In another embodiment, image sensor assembly 107 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 102 and RAM 120 are within the scope of this disclosure.

In a further aspect, the image sensor assembly 107 can include an imaging lens assembly 130 for focusing an image of the decodable indicia 30 onto image sensor 102. Imaging light rays can be transmitted about an optical axis 132. Lens assembly 130 can be controlled with use of lens assembly control circuit 144. Lens assembly control circuit 144 can send signals to lens assembly 130, e.g., for changing a focal length and/or a best focus distance of lens assembly 130.

Image sensor assembly 107 can include various interface circuits for coupling several of the peripheral devices to system address/data bus (system bus) bus 158, for communication with second microprocessor 118 also coupled to system bus 158. Image sensor assembly 107 can include interface circuit 160 for coupling image sensor timing and control circuit timing and control circuit 144 to system bus 158, interface circuit 162 for coupling the lens assembly control circuit 144 to system bus 158, interface circuit 164 for coupling the illumination assembly control circuit 146 to system bus 158, interface circuit 166 for coupling the display 150 to system bus 158, interface circuit 168 for coupling keyboard 152, pointing device 154, and trigger 156 to system bus 158, and interface circuit 170 for coupling the filter module control circuit 148 to system bus 158.

In a further aspect, image sensor assembly 107 can include one or more I/O interfaces 172, 174 for providing communication with external devices (e.g., a POS cash register computer, a retail store server, an inventory facility server, a local area network base station, or a cellular base station). I/O interfaces 172, 174 can be interfaces of any combination of known computer interfaces, e.g., Ethernet (IEEE 802.3), USB, IEEE 802.11, Bluetooth, CDMA, and GSM.

In another aspect, mobile computing device 100 can include at least one motion sensor. In one embodiment, the motion sensor can be provided, e.g., by an accelerometer configured to detect the g-force, and can be employed to detect changes in the spatial orientation of the imaging device 98 and/or coordinate acceleration of the imaging device 98. In one embodiment, the motion sensor can be provided, e.g., by a gyroscope configured to detect changes in the spatial orientation of the imaging device 98. In one embodiment, mobile computing device 100 can include both an accelerometer and a gyroscope. In another embodiment, mobile computing device can only include an accelerometer.

In another aspect, mobile computing device 100 can be capable of following focus and measuring the distance between the lens and the target object.

As noted herein supra, mobile computing device 100 can be configured to compensate for the device movement relatively to the target object during the time period elapsed between taking and displaying a preview image frame. Mobile computing device 100 can be configured to transform the preview image frame based on the device movement detected by a motion sensor (e.g., an accelerometer and/or a gyroscope). In a further aspect, the preview image can be shifted, rotated, and/or scaled in order to compensate for the device movement.

Figure 3:
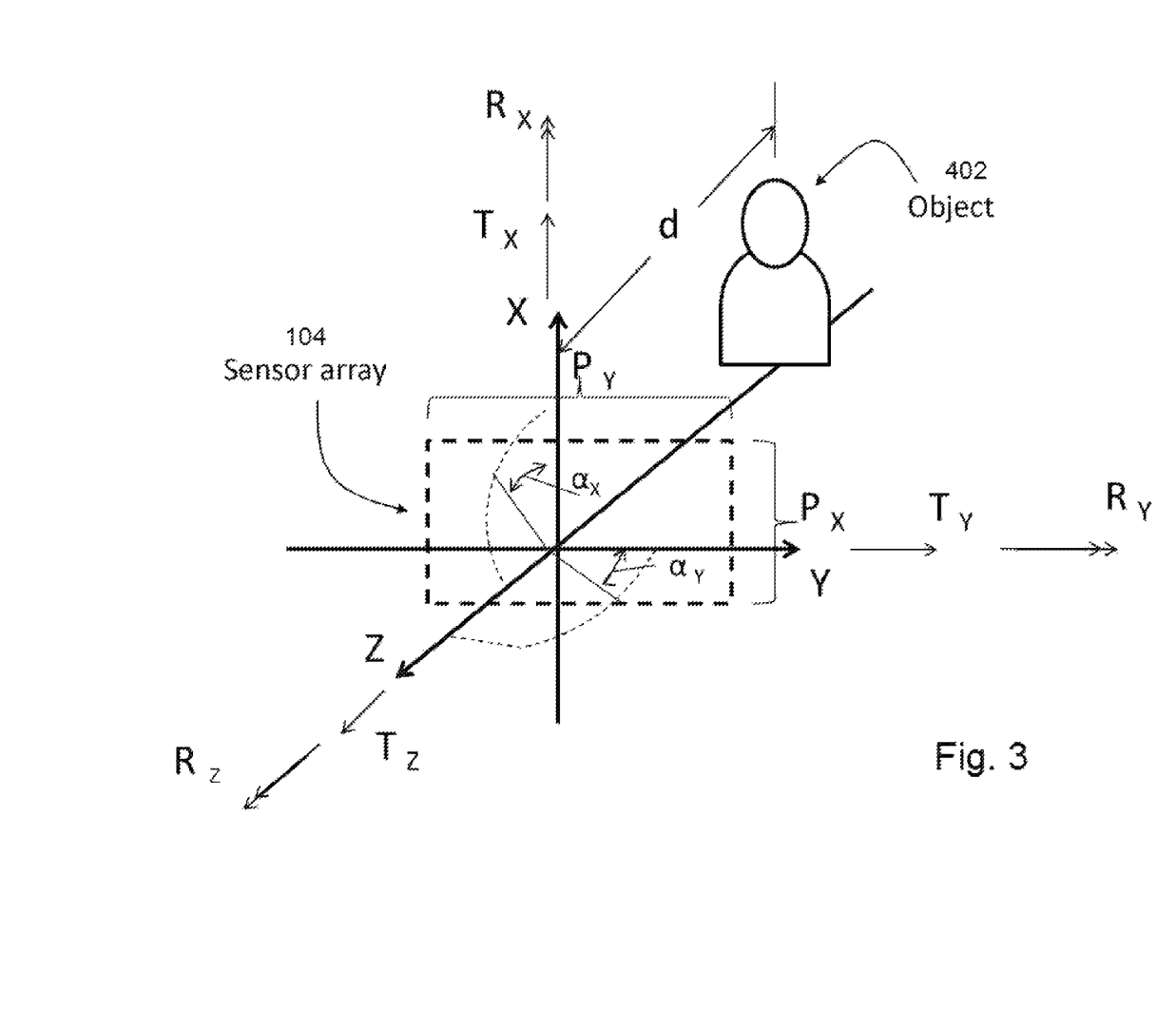
FIG. 3 schematically illustrates one embodiment of method of transforming a preview image frame.

One embodiment of method of transforming a preview image frame is being described with references to FIG. 3.

For illustrative purposes, the image sensor pixels can be assumed to have the same vertical and horizontal pitch and are thus be effectively square. In a right-handed coordinate system where the z axis positive direction is pointing "out of the page", and where clockwise rotation when viewed along the increasing direction of an axis is positive, the image sensor array 104 can be assumed to be a rectangular array of pixels $P_x$ pixels wide and $P_y$ pixels high. The image can be assumed to be located at the origin, with its x and y pixel directions aligned with the x and y axes respectively, and with the lens 130 pointing in the negative z direction (i.e. "into the page"). The angle of view of the image sensor's lens assembly in the xz and yz planes can be denoted as $a_x$ and $a_y$ respectively.

The distance between the lens 130 and the target object can be denoted as d. In a further aspect, if this distance cannot actually be measured then a typical value can be assumed according to the use case that. The assumed value can be selected in such a way that it can most likely be greater than or equal to the actual distance, as it would be better to under-compensate rather than over-compensate.

The net translation along x, y and z axes of the image sensor between the time the image was captured by the sensor and when it is displayed can be denoted as Tx, Ty and Tz respectively. The net rotation about x, y and z axes of the image sensor between the time the image was captured by the sensor and when it is displayed can be denoted as Rx, Ry and Rz respectively.

Thus, the compensation due to translation along x axis can be represented as a pixel shift in the x direction of:

$$C_X = P x T x / (2d \tan(a_x/2)) \text{ pixels.}$$

The compensation due to translation along y axis can be represented as a pixel shift in the y direction of:

$$C_Y = P y T y / (2d \tan(a_y/2)) \text{ pixels.}$$

The compensation due to translation along the z axis can be represented as an image size adjustment of linear magnitude:

$$d/(d-T_Z)$$

The compensation due to rotation about the x axis can be approximated to a pixel shift in the x direction of magnitude:

$$PyRx/a_x$$

The compensation due to rotation about the y axis can be approximated to a pixel shift in the x direction of magnitude:

$$-PxRy/a_y$$

The compensation due to rotation about the z axis can be represented as a corresponding image rotation of:

$$-Rz$$

In one embodiment, image transformation to compensate for the camera movement can include a pixel shift, an image rotation, and an image scaling. However, because the impact of z axis translation and rotation is likely to be much smaller than for the other two axes, it will in many cases be possible to ignore Tz and Rz terms. Thus, in one embodiment, image transformation to compensate for the camera movement can include only pixel shift operations.

Thus, mobile computing device 100 can be configured to transform the preview image frame by applying the following pixel shift values. The total pixel shift in the x direction can be calculated as follows:

$$Px(Tx/(2d\tan(a_x/2))-Ry/a_y),$$

and the total pixel shift in the y direction can be calculated as follows:

$$Py(Ty/(2d\tan(a_y/2))+R_x/a_x)$$

Figure 4:
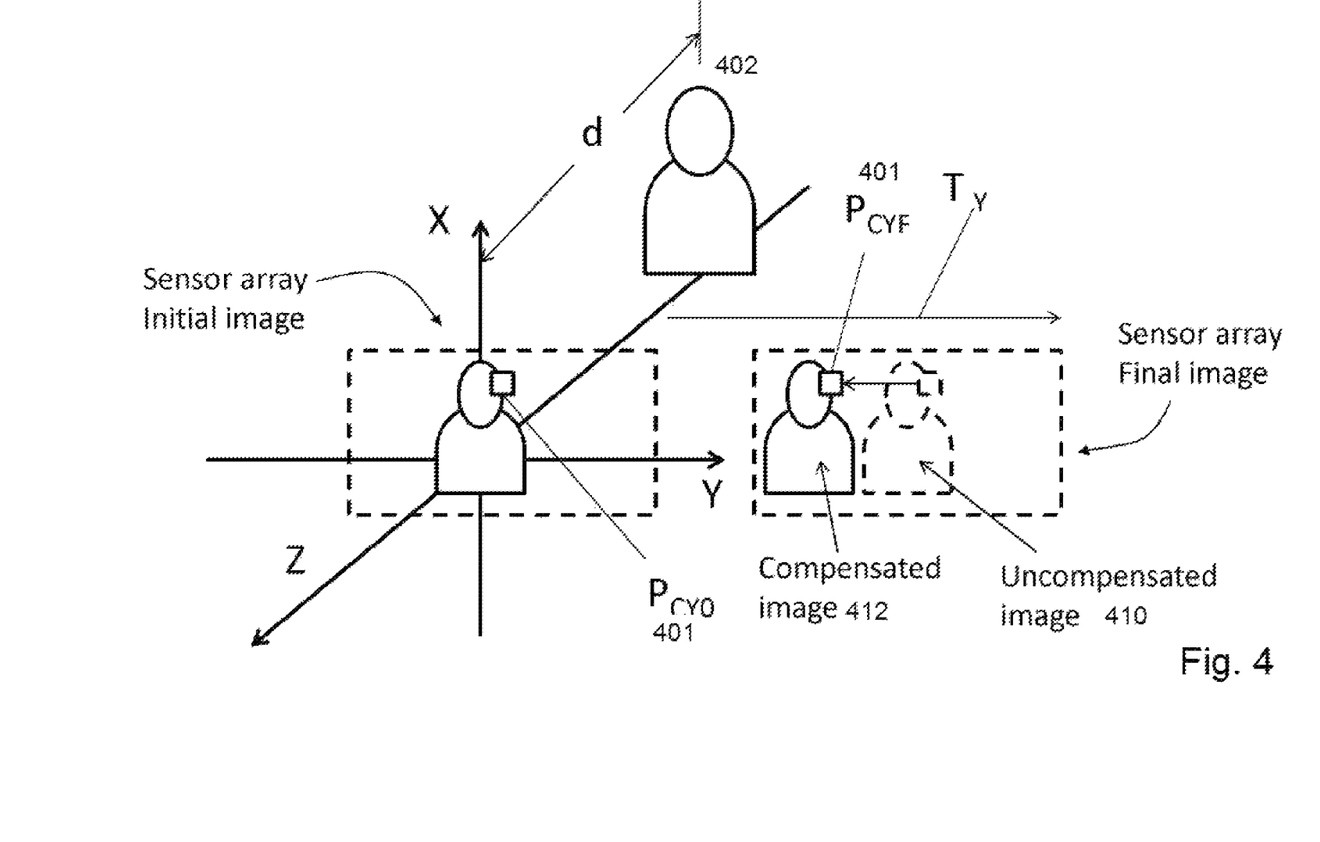
FIGS. 4-5 schematically illustrate transforming a preview image frame to compensate for the imaging device movement using the above described method.
Figure 5:
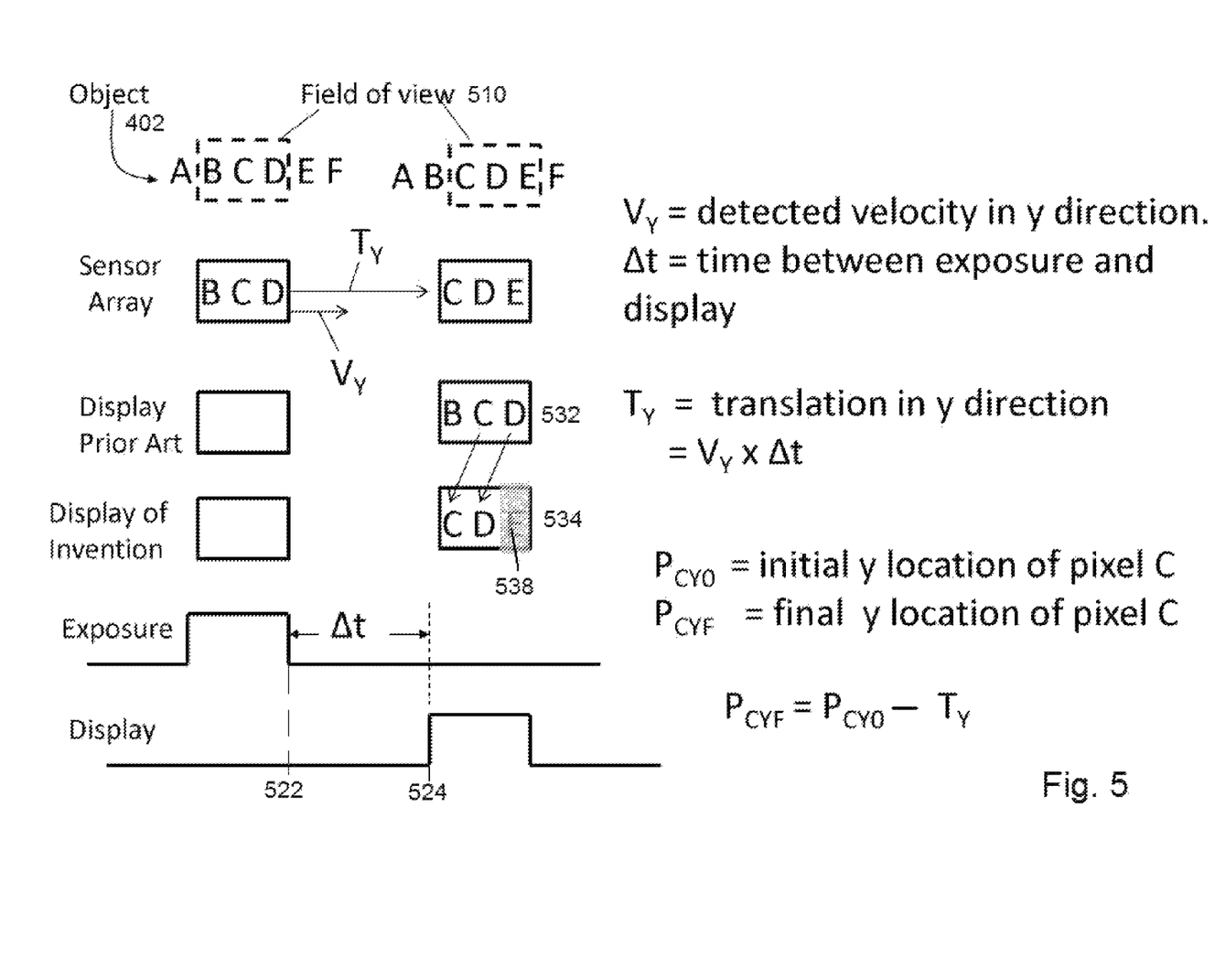

FIGS. 4-5 schematically illustrate transforming a preview image frame to compensate for the imaging device movement using the above described method. As shown in FIG. 4, the y coordinate of an arbitrarily chosen element 401 of the target object 402 at the time of taking an image of the target object 402 can be denoted as $P_{CY0}$. Due to movement of the mobile computing device 100 between the time of taking the image and the time of displaying the image, the y coordinate of the same element 401 of the target object 402 in the displayed frame can be adjusted using the above described method:

$$P_{CYF} = P_{CY0} + Py(Ty/(2d\tan(a_y/2))+R_x/a_x)$$

Assuming that at the time of taking the image, the target object was centered in the image frame, the dashed line 410 schematically shows the position of the target object 402 within the uncompensated image frame. Further assuming that between the time of taking the image and the time of displaying the image mobile computing device 100 was rotated to the right, the preview image frame should be shifted to the left to compensate for the imaging device movement, and hence the solid line 412 schematically shows the position of the target object 402 within the resulting (compensated) image frame.

As shown in FIG. 5, the field of view 510 of imaging device 98 has moved to the right between the time 522 of taking the image and the time 524 of displaying the image. While a prior art mobile computing device would not compensate for the device movement, and hence would display uncompensated preview image frame 532, mobile computing device 10 can apply the above described compensation method and hence can display a compensated preview image frame 534.

In a further aspect, the mobile computing device can be further configured to introduce a colored polygon 538 to the preview image frame 534 to minimize a perceived visual disturbance caused by the mobile computing device movement, as shown in FIG. 5. The polygon can be colored using a color similar to a color of an area of the preview image frame closest to the polygon.

A sample of systems and methods that are described herein follows:

A1. A mobile computing device comprising:
a microprocessor;
an imaging device including a two-dimensional image sensor communicatively coupled to said microprocessor and an imaging lens configured to focus an image of a target object on said two-dimensional image sensor;
a display communicatively coupled to said microprocessor;
at least one motion sensor communicatively coupled to said microprocessor;
wherein said mobile computing device is configured to periodically display a preview image frame of said target object on said display;
wherein said mobile computing device is further configured to compensate for a movement of said imaging device relatively to said target object during a time period elapsed between taking and displaying said preview image frame, by transforming said preview image frame based on device movement detected by said at least one motion sensor.

A2. The mobile computing device of claim A1, wherein said at least one motion sensor is provided by an accelerometer.

A3. The mobile computing device of claim A1, wherein said at least one motion sensor is provided by a gyroscope.

A4. The mobile computing device of claim A1, wherein said imaging device is configured to measure distance between said imaging lens and said target object.

A5. The mobile computing device of claim A1, wherein said transformation of said preview image frame comprises a pixel shift.

A6. The mobile computing device of claim A1, wherein said transformation of said preview image frame comprises a rotation of said preview image.

A7. The mobile computing device of claim A1, wherein said transformation of said preview image frame comprises a scaling of said preview image.

A8. The mobile computing device of claim A1, further configured to introduce a colored polygon to said preview image frame to minimize a perceived visual disturbance caused by a motion of said mobile computing device.

A9. The mobile computing device of claim A1, further configured to introduce a polygon to said preview image frame;
wherein said polygon is colored using a color similar to a color of an area of said preview image frame closest to said polygon.

A10. The mobile computing device of claim A1, wherein said target object is provided by optical decodable indicia; and
wherein said microprocessor is configured to output decoded message data corresponding to said decodable indicia.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A mobile computing device comprising:
a microprocessor;
an imaging device including a two-dimensional image sensor communicatively coupled to said microprocessor and an imaging lens configured to focus an image of a target object on said two-dimensional image sensor;
a display communicatively coupled to said microprocessor;
at least one motion sensor communicatively coupled to said microprocessor;
wherein said mobile computing device is configured to periodically display a preview image frame of said target object on said display;
wherein said mobile computing device is further configured to compensate for a movement of said imaging device relative to said target object during a time period elapsed between taking and displaying said preview image frame, by transforming said preview image frame after taking of said preview image frame based on device movement detected by said at least one motion sensor; and
wherein said transformation of said preview image frame comprises:
a pixel shift in a same x direction as an imaging device translation along an x axis; and
a pixel shift in a same y direction as an imaging device translation along a y axis.

2. The mobile computing device of claim 1, wherein said at least one motion sensor is provided by an accelerometer.

3. The mobile computing device of claim 1, wherein said at least one motion sensor is provided by a gyroscope.

4. The mobile computing device of claim 1, wherein said imaging device is configured to measure distance between said imaging lens and said target object.

5. The mobile computing device of claim 1, wherein said transformation of said preview image frame comprises a rotation of said preview image.

6. The mobile computing device of claim 1, wherein said transformation of said preview image frame comprises a scaling of said preview image.

7. The mobile computing device of claim 1, further configured to introduce a colored polygon to said preview image frame to minimize a perceived visual disturbance caused by a movement of said mobile computing device.

8. The mobile computing device of claim 1, further configured to introduce a polygon to said preview image frame;
wherein said polygon is colored using a color similar to a color of an area of said preview image frame closest to said polygon.

9. The mobile computing device of claim 1, wherein said target object is provided by optical decodable indicia; and
wherein said microprocessor is configured to output decoded message data corresponding to said decodable indicia.

10. A mobile device comprising:
an imaging device for capturing image frames;
a display for displaying images;
a motion sensor for sensing motion of the mobile device; and
a microprocessor communicatively coupled to the imaging device, the display, and the motion sensor, the microprocessor being configured for:
capturing image frames with the imaging device;
displaying a preview image frame on the display corresponding to a captured image frame;
sensing motion of the mobile device with the motion sensor;
in response to the sensing of movement of the mobile device during a time period between (i) capturing the captured image frame corresponding to the displayed preview image frame and (ii) displaying the preview image frame, shifting pixels of the preview image frame in the same direction of the sensed motion of the mobile device;
wherein shifting pixels of the preview image frame in the same direction of the sensed motion of the mobile device, comprises:
a pixel shift in a same x direction as a mobile device translation along an x axis; and
a pixel shift in a same y direction as a mobile device translation along a y axis.

11. The mobile device of claim 10, wherein the motion sensor comprises an accelerometer.

12. The mobile device of claim 10, wherein the motion sensor comprises a gyroscope.

13. The mobile device of claim 10, wherein the imaging device comprises a two-dimensional image sensor.

14. The mobile device of claim 10, wherein the imaging device comprises:
a two-dimensional image sensor; and
an imaging lens for focusing light on the two-dimensional image sensor.

15. The mobile device of claim 10, wherein the microprocessor is configured for, in response to the sensing of movement of the mobile device during a time period between (i) capturing the captured image frame corresponding to the displayed preview image frame and (ii) displaying the preview image frame, rotating the preview image frame.

16. The mobile device of claim 10, wherein the microprocessor is configured for, in response to the sensing of movement of the mobile device during a time period between (i) capturing the captured image frame corresponding to the displayed preview image frame and (ii) displaying the preview image frame, scaling the preview image frame.

17. A mobile device comprising:
an imaging device for capturing image frames;
a display for displaying images;
a motion sensor for sensing motion of the mobile device; and
a microprocessor communicatively coupled to the imaging device, the display, and the motion sensor, the microprocessor being configured for:
capturing image frames with the imaging device;
displaying a preview image frame on the display corresponding to a captured image frame;
sensing motion of the mobile device with the motion sensor;
in response to the sensing of movement of the mobile device during a time period between (i) capturing the captured image frame corresponding to the displayed preview image frame and (ii) displaying the preview image frame, shifting pixels of the preview image frame in the same direction of the sensed motion of the mobile device; and attempting to decode decodable indicia in a captured image frame;

wherein shifting pixels of the preview image frame in the same direction of the sensed motion of the mobile device, comprises:

a pixel shift in a same x direction as a mobile device translation along an x axis; and a pixel shift in a same y direction as a mobile device translation along a y axis.

18. The mobile device of claim 17, wherein the motion sensor comprises an accelerometer.

19. The mobile device of claim 17, wherein the microprocessor is configured for, in response to the sensing of movement of the mobile device during a time period between (i) capturing the captured image frame corresponding to the displayed preview image frame and (ii) displaying the preview image frame, rotating the preview image frame.

20. The mobile device of claim 17, wherein the microprocessor is configured for in response to the sensing of movement of the mobile device during a time period between (i) capturing the captured image frame corresponding to the displayed preview image frame and (ii) displaying the preview image frame, scaling the preview image frame.

* * * * *